(12) United States Patent
Diachina et al.

(10) Patent No.: US 8,238,276 B2
(45) Date of Patent: Aug. 7, 2012

(54) DETECTING THE PRESENCE OF CODING SCHEME CS-I RLC/MAC CONTROL MESSAGE

(75) Inventors: John Diachina, Garner, NC (US); Stefan Eriksson, Hasselby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 545 days.

(21) Appl. No.: 12/531,224

(22) PCT Filed: Mar. 7, 2008

(86) PCT No.: PCT/SE2008/000184
§ 371 (c)(1),
(2), (4) Date: Sep. 14, 2009

(87) PCT Pub. No.: WO2008/115114
PCT Pub. Date: Sep. 25, 2008

(65) Prior Publication Data
US 2010/0110946 A1    May 6, 2010

Related U.S. Application Data

(60) Provisional application No. 60/895,342, filed on Mar. 16, 2007.

(51) Int. Cl.
*H04B 7/00* (2006.01)
*H04B 3/24* (2006.01)
(52) U.S. Cl. ......... 370/310; 370/349; 370/474; 455/522
(58) Field of Classification Search .................. 370/310, 370/312, 346, 336, 332; 455/522, 436
See application file for complete search history.

(56) References Cited

U.S. PATENT DOCUMENTS

2004/0013095 A1    1/2004   Western et al.
(Continued)

FOREIGN PATENT DOCUMENTS
EP    1255368 A1    11/2002

OTHER PUBLICATIONS

3GPP TSG GERAN #32 "Multiplexing of RTTI and legacy MS on the same PDCH"; Sophia Antipolis, France; Nov. 16-20, 2006; Tdoc GP-062200; Source: Ericsson.*

(Continued)

*Primary Examiner* — Ian N Moore
*Assistant Examiner* — Afshawn Towfighi
(74) *Attorney, Agent, or Firm* — Coats & Bennett, P.L.L.C.

(57) ABSTRACT

A method of transmitting a downlink, coding scheme CS-1 RLC/MAC control message from a BSS to an EGPRS MS (61), and receiving and detecting the CS-1 RLC/MAC control message in the MS. The BSS places in an MCS-1 radio block, a CS-1 RLC/MAC control block identical to a coding scheme CS-1 RLC/MAC control message excluding the MAC header octet. The BSS also places a coding scheme CS-4 stealing bit code word in the radio block using legacy stealing bit values and positions. The CPS field (26) of the block header (25) indicates that the radio block contains a CS-1 RLC/MAC control message. The MS receives the radio block and detects the coding scheme CS-4 stealing bit code word. In response, the MS interprets the received radio block header to identify the CPS field. The MS determines from the CPS field that a CS-1 RLC/MAC control block has been received.

14 Claims, 6 Drawing Sheets

U.S. PATENT DOCUMENTS

2004/0218567 A1 11/2004 Budka et al.
2007/0002823 A1* 1/2007 Skov Andersen et al. .... 370/349

OTHER PUBLICATIONS

3GPP TSG GERAN #33 "Coding Scheme Update of RTTI"; Seoul, Korea; Feb. 12-16, 2007; Tdoc GP-070169; Source: Huawei.*

3rd Generation Partnership Project. "Downlink Signalling in RTTI Mode." 3GPP TSG GERAN#34bis, Tdoc G2-070173, Agenda item 5.3.6, Pavoa de Varzim, Portugal, Jun. 25-29, 2007.

3rd Generation Partnership Project. "Downlink Signalling in RTTI Mode." 3GPP TSG GERAN #34, Tdoc GP-070715, Agenda items 7.1.5.8, 7.2.5.3.6, Shenzhen, China, May 14-18, 2007.

* cited by examiner

# DETECTING THE PRESENCE OF CODING SCHEME CS-I RLC/MAC CONTROL MESSAGE

RELATED APPLICATIONS

This application claims the benefit of U.S. Provisional Application No. 60/895,342 filed Mar. 16, 2007.

TECHNICAL FIELD

This invention relates to radio communication networks. More particularly, and not by way of limitation, the invention is directed to a method of transmitting a Radio Link Control/Media Access Control (RLC/MAC) control message to an Enhanced General Packet Radio Service (EGPRS) mobile station, and a processing unit in the mobile station for detecting the presence of a coding scheme CS-1 RLC/MAC control message.

BACKGROUND

When EGPRS was standardized, legacy GPRS mobile stations (MSs) were required to decode the Uplink State Flag (USF) of EGPRS radio blocks. EGPRS radio blocks can be modulated utilizing either Gaussian Minimum Shift Keying (GMSK) as in Modulation and Coding Schemes MCS-1 to MCS-4, or Eight-Phase Shift Keying (8PSK) as in Modulation and Coding Schemes MCS-5 to MCS-9. GPRS MSs cannot receive 8PSK-modulated EGPRS radio blocks, but a solution was found enabling GPRS MSs to receive GMSK-modulated EGPRS radio blocks. The solution was to encode and interleave the USF of the GMSK-modulated EGPRS radio blocks exactly the same way as one of the GPRS coding schemes, namely CS-4. The GPRS MS was led to believe that a CS-4 radio block was received by putting stealing bits in the GMSK-modulated EGPRS radio blocks in the same positions as in the legacy GPRS radio blocks and setting these stealing flags to the codeword for CS-4. Consequently, unless the radio conditions were too bad, the GPRS MS could successfully decode the USF believing the block was a CS-4 radio block. Subsequently, the GPRS MS would attempt to decode the rest of the EGPRS radio block as a CS-4 block and fail (detected by a CRC failure). However, this solution still allows for satisfying the primary objective of using the USF, received within the context of an MCS-5 to MCS-9 encoded EGPRS radio block, to schedule uplink transmissions for a legacy GPRS MS.

EGPRS MSs also read the legacy stealing bits, but for the EGPRS MS, the CS-4 stealing bit code word indicates that an EGPRS radio block has been sent using one of the Modulation and Coding Schemes MCS-1 to MCS-4. Consequently, an EGPRS MS can successfully decode the USF since the USF is placed in the right position (same as for CS-4). In order to determine which of MCS-1 to MCS-4 has been used, the EGPRS MS decodes the RLC/MAC header and looks at the Coding and Puncturing Scheme (CPS) field, and decodes the rest of the radio block. If, the radio block actually was a CS-4 radio block, this latter part will fail (detected by a CRC failure during RLC/MAC header decoding). However, this solution also still allows for satisfying the primary objective of using the USF, received within the context of a CS-1 to MS-4 encoded GPRS radio block, to schedule uplink transmissions for an EGPRS MS.

EGPRS MSs must also be able to decode the USF of GPRS CS-1 to CS-3 radio blocks. Therefore, they must be able to decode the stealing bit code words of these coding schemes as well.

Thus for an EGPRS MS, the MS reads the stealing bits and if it detects the CS-4 stealing bit code word it causes the EGPRS MS to think that an MCS-1 to MCS-4 block has been received. The EGPRS MS can successfully decode the USF if the CS-4 stealing bit code word is used since for MCS-1 to MCS-4 the USF is carried in the same way as for CS-4 blocks. The EGPRS MS then attempts to decode the RLC/MAC header (the CPS field in particular) to see which of the MCS-1 to MCS-4 blocks has been received. If an MCS-1 to MCS-4 block was really sent, then the EGPRS MS successfully decodes the RLC/MAC header. If a CS-4 block was really sent, then the EGPRS MS fails to successfully decode the RLC/MAC header. The EGPRS MS is also able to decode the CS-1 to CS-3 stealing bit code words and therefore read the USF sent along with CS-1 to CS-3 blocks. However, if these USFs are detected, the EGPRS MS shall not attempt to decode the RLC/MAC header to try and verify the presence of a MCS-1 to MCS-3 block (i.e., only for the case of a CS-4 stealing bit code word will the EGPRS MS be able to read the USF and potentially receive an MCS-1 to MCS-4 block).

For a GPRS MS, if a CS-4 stealing bit code word is read, it causes the GPRS MS to think that a CS-4 block has been received. The GPRS MS attempts to decode the RLC/MAC header as if a CS-4 block has been received. If a CS-4 block was sent, then the GPRS MS successfully decodes the RLC/MAC header. If an MCS-1 to MCS-4 block was really sent, then the GPRS MS fails to successfully decode the RLC/MAC header.

FIG. 1 illustrates a radio block 10 coded using the conventional GPRS coding scheme CS-1. In EGPRS, the RLC/MAC control messages are sent using the GPRS coding scheme CS-1. This is for legacy reasons, to allow GPRS MSs to read the same message in case the content is a distribution message. In the current specification for EGPRS, MSs read the stealing bits first, and then decode the USF according to the value of the stealing bits (SBs). For a CS-1 encoded downlink block, the USF is encoded together with the payload as shown in block 11 and can only be obtained after convolutional decoding of the entire radio block.

In release 7 of the 3GPP standard, a new type of radio block—Reduced Transmit Time Interval (RTTI)—is defined. RTTI radio blocks are transmitted in 10 ms over two timeslots instead of in 20 ms over one timeslot. A detailed description of RTTI is found in the 3GPP Technical Requirement TR 45.912 and in the 3GPP Technical Specification TS 43.064.

The GPRS/EGPRS USF can be read by RTTI-capable MSs. The same principle discussed above of causing the MS to believe something else has been transmitted is used when RTTI radio blocks are sent in the downlink. The legacy (GPRS or EGPRS) MS is led to believe that legacy radio blocks have been transmitted. The USF bits are put in the positions where the legacy MS expects them to be, and the bits are encoded in the same way. A consequence of placing the USF bits in the positions where the legacy MS expects them to be is that two RTTI radio blocks during a 20-ms period must be sent using the same modulation. There is no modulation restriction for legacy radio blocks.

FIG. 2 illustrates the reservation of legacy stealing bits for a GMSK-modulated transmission. When GMSK-modulated RTTI blocks are sent in the downlink, stealing bits are put in the positions where the legacy GPRS/EGPRS MS expects them (i.e., in four consecutive TDMA frames comprising a radio block on a single timeslot). Setting these stealing bits to the CS-4 stealing bit code word leads the legacy GPRS MS to believe that a CS-4 block has been sent, and it leads the EGPRS MS to believe that an MCS-1 to MCS-4 block has been sent (in both cases interleaved over 20 ms on one timeslot). As shown in FIG. 2, the stealing bits of GPRS/EGPRS are placed in the two closest positions (one on each side) to the training sequence (TSC) of each burst (i.e., a total of eight bits over 20 ms). To indicate CS-4/MCS-1 to MCS-4, the bits are set to 00010110.

FIG. 3 illustrates the reservation of legacy USF bits for RTTI radio blocks. The USF bits must also be placed where the legacy MS expects them (i.e., as in a CS-4 and MCS-1 to MCS-4 radio block). As shown in FIG. 3, there are a total of twelve USF bits per legacy radio block—three in each burst. The correct positions are different in the four bursts in a legacy radio block. Table 1 below shows the positions of the twelve USF bits for a GMSK-modulated radio block.

TABLE 1

| Burst # | Positions |
|---------|-----------|
| 0 | 0, 50, 100 |
| 1 | 34, 84, 98 |
| 2 | 18, 68, 82 |
| 3 | 2, 52, 66 |

When the legacy stealing bits and USF bits have been reserved for legacy purposes, there remain 116−2−3=111 bits per burst for the RTTI blocks. Thus, over 10 ms on two timeslots, there are a total of 444 bits. Note that the RLC/MAC header (excluding USF) and RLC data part of the RTTI block fit perfectly into these 444 bits without modification. With this solution, legacy MSs are able to decode the USF when RTTI blocks are sent in the downlink.

There is also a conventional solution enabling 8PSK-modulated RTTI radio blocks to be sent in the downlink. This solution is not applicable to the present invention, and will not be discussed further herein.

According to the state-of-the-art, RLC/MAC control messages are sent to RTTI MSs using CS-1 coding with reduced TTI (10 ms). In order for the MS to read the USF, the legacy SB and USF positions must be reserved.

There are a number of problems with the conventional solutions described above. First, the RTTI MS must be able to distinguish between two types of RTTI blocks—CS-1 (for the Packet Associated Control Channel, PACCH, and RLC/MAC control signaling) and MCS-1 to MCS-4 (for RLC data). The stealing bits, which are normally used for this purpose by legacy MSs as described above, cannot be used since they have been reserved for legacy purposes. In other words, the legacy stealing bits will continue to be used in the legacy manner to allow a legacy MS to be multiplexed on the same PDCHs where RTTI blocks are sent and will therefore only make sense if read according to BTTI burst sequencing (i.e. something not done by an MS with a DL RTTI TBF).

A state-of-the-art solution to this problem is described in the 3GPP technical document GP-060200, "Multiplexing of RTTI and legacy MS on the same PDCH", TSG GERAN #32. This solution uses blind detection as described below.

1. The RTTI MS deinterleaves the bits in the bursts comprising an RTTI block. The interleaving is exactly the same for CS-1 as for MCS-1 to MCS-4.

2. The RTTI MS assumes that an MCS-1 to MCS-4 block has been sent, and decodes the RLC/MAC header.
  a. If the RLC/MAC header is correctly decoded (e.g., CRC check passes), an MCS-1 to MCS-4 block has been received and the RTTI MS continues to decode the RLC data.
  b. If the RLC/MAC header is incorrectly decoded (e.g., CRC check fails), the RTTI MS assumes that a CS-1 block has been received and decodes it accordingly.

The problem with this state-of-the-art solution is that double decoding is necessary. This increases decoding complexity.

A second problem arises because the USF is encoded together with the data in a CS-1 block. Therefore, there are no available bits in the RTTI block to reserve for the stealing flags (SFs) or for the USF.

A state-of-the-art solution to this problem is described in the 3GPP technical document GP-070169, "Coding Scheme Update of RTTI", TSG GERAN #33. In this solution, bits in the CS-1 block are punctured to give room for the SF/USF bits. The payload bits in the CS-1 block originally carried by the bits at these positions (see Table 1) are substituted and lost, so the downlink payload reception is adversely affected. The current coding schemes need to be updated to minimize this influence.

Thus the problem with this state-of-the-art solution is that bits are punctured. This degrades link performance of the RLC/MAC control messages, which are crucial for proper operation of the link.

SUMMARY

What is needed in the art is a method for transmitting RLC/MAC control messages to EGPRS MSs and a processing unit in the mobile station for detecting the presence of a coding scheme CS-1 RLC/MAC control message that overcomes the disadvantages of the prior art outlined above. The present invention provides such a method and processing unit.

The present invention provides a method for transmitting an RLC/MAC control message to an EGPRS MS, and a method and processing unit in the MS for receiving and detecting the RLC/MAC control blocks comprising the RLC/MAC control message. The invention does not require double decoding and does not degrade link performance because of bit puncturing.

In one embodiment, the present invention is directed to a method of transmitting a downlink, coding scheme-1 (CS-1) RLC/MAC control message to an EGPRS mobile station. The method includes the steps of transmitting the RLC/MAC control block header content of the downlink CS-1 RLC/MAC control message in an RLC data header of an MCS-1 radio block; transmitting the RLC/MAC control block message content of the downlink CS-1 RLC/MAC control message in an RLC data part of the MCS-1 radio block; and utilizing a coding and puncturing scheme (CPS) field of the MCS-1 RLC data header to signal to a layer 2 entity in the EGPRS mobile station that the MCS-1 radio block contains a CS-1 RLC/MAC control block. Depending on the length of a CS-1 RLC/MAC control message more than one MCS-1 radio block may be required to transmit it.

In another embodiment, the present invention is directed to a method of transmitting an RLC/MAC control message to an EGPRS mobile station in which the BSS places in an MCS-1 radio block, a CS-1 RLC/MAC control message having a header part and a message part identical to a downlink CS-1 RLC/MAC control message excluding the MAC header octet. Depending on the length of the CS-1 RLC/MAC control message, more than one MCS-1 radio block may be required to transmit it. The BSS also places in the MCS-1 radio block, a coding scheme CS-4 stealing bit code word using legacy stealing bits (i.e. using legacy bit values and legacy bit positions). The BSS indicates in the CPS field of the MCS-1 header part that the MCS-1 radio block contains a CS-1

RLC/MAC control block excluding the MAC header octet. The BSS then transmits the MCS-1 radio block to the mobile station.

In another embodiment, the present invention is directed to a method in an EGPRS mobile station of detecting that a received radio block contains an CS-1 RLC/MAC control block. The method includes the steps of detecting in the received radio block, a coding scheme CS-4 stealing bit code word sent using legacy stealing bits; in response to detecting the CS-4 stealing bit code word, interpreting a block header contained in the received radio block to identify a CPS field; and determining from the CPS field that an MCS-1 radio block containing a CS-1 RLC/MAC control block has been received.

In another embodiment, the present invention is directed to a processing unit in an EGPRS mobile station for detecting that a received radio block contains a CS-1 RLC/MAC control block. The processing unit includes a stealing bit detector for detecting in the received radio block, a coding scheme CS-4 stealing bit code word sent using legacy stealing bits. The processing unit also includes a radio block header interpreter responsive to detecting the CS-4 stealing bit code word, for interpreting a radio block header contained in the received radio block to identify a coding and puncturing scheme, CPS, field; and a CPS field interpreter for determining from the CPS field that an MCS-1 control block has been received.

BRIEF DESCRIPTION OF THE DRAWINGS

In the following, the essential features of the invention will be described in detail by showing preferred embodiments, with reference to the attached figures in which.

DETAILED DESCRIPTION

In one exemplary embodiment, the present invention sends RLC/MAC control blocks comprising a CS-1 RLC/MAC control message to Reduced Transmission Time Interval (RTTI) mobile stations (MSs) with the Enhanced General Packet Radio Service (EGPRS) modulation and coding scheme MCS-1. The MS looks for the stealing bit code word=CS-4. If the Basic TTI (BTTI) USF mode is used, the CS-4 stealing bit code word is sent using legacy stealing bits interpreted in the legacy BTTI burst sequence. If the RTTI USF mode is used, the CS-4 stealing bit code word is sent using bits interpreted in the RTTI burst sequence. Once the MS determines that a CS-4 stealing bit code word has been received, the MS starts interpreting the radio block header (using the bursts interpreted in the RTTI burst sequence) as a Header Type 3 (i.e. it assumes it has received an MCS-1 to MCS-4 radio block) and, assuming that is what was actually sent by the BSS, it then looks at the CPS field to determine that an MCS-1 radio block containing a CS-1 RLC/MAC control block has been received.

| | |
|---|---|
| AC | Address Control Field |
| BSN1 | Block Sequence Number 1 |
| CPS | Coding and Puncturing Scheme |
| D | Direction Field |
| ES/P | EGPRS Supplementary/Polling Field |
| FS | Final Segment Field |
| FSe | FS bit set = 0 |
| RRBP | Relative Reserved Block Period |
| RTI | Radio Transaction Identifier |
| S/P | Supplementary/Polling Field |
| TFI | Temporary Flow Identifier |
| PR | Power Reduction Field |
| RBSN | Reduced Block Sequence Number |
| RBSNe | RBSN set = 1 |
| SPB | Split Block Indicator |
| USF | Uplink State Flag |

Figure 1:
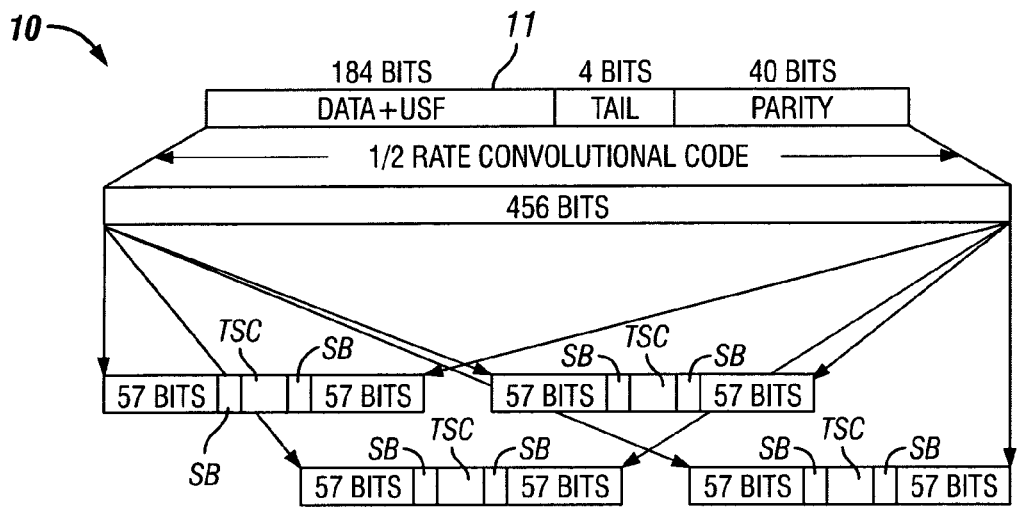
FIG. 1 (Prior Art) illustrates a radio block coded using the conventional GPRS coding scheme CS-1.
Figure 2:
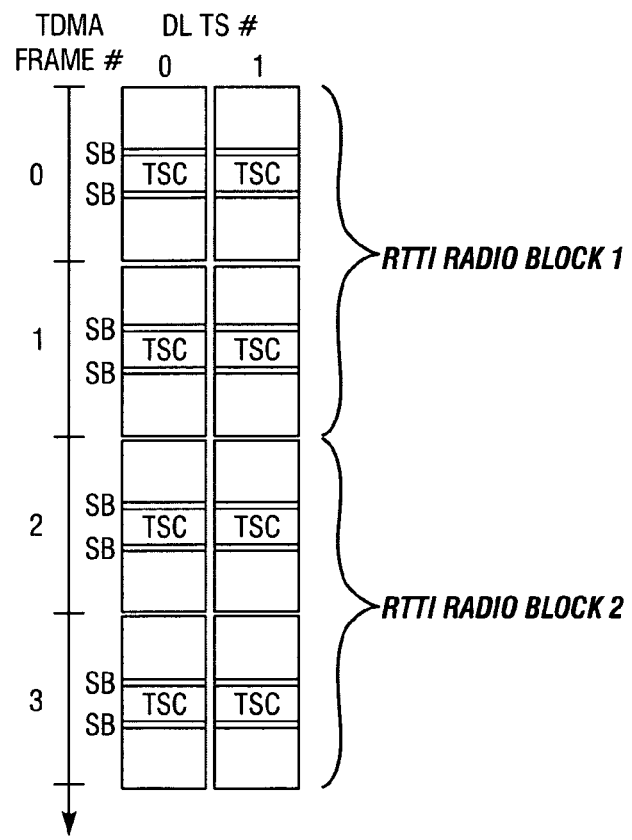
FIG. 2 (Prior Art) illustrates the reservation of legacy stealing bits for a GMSK-modulated transmission.
Figure 3:
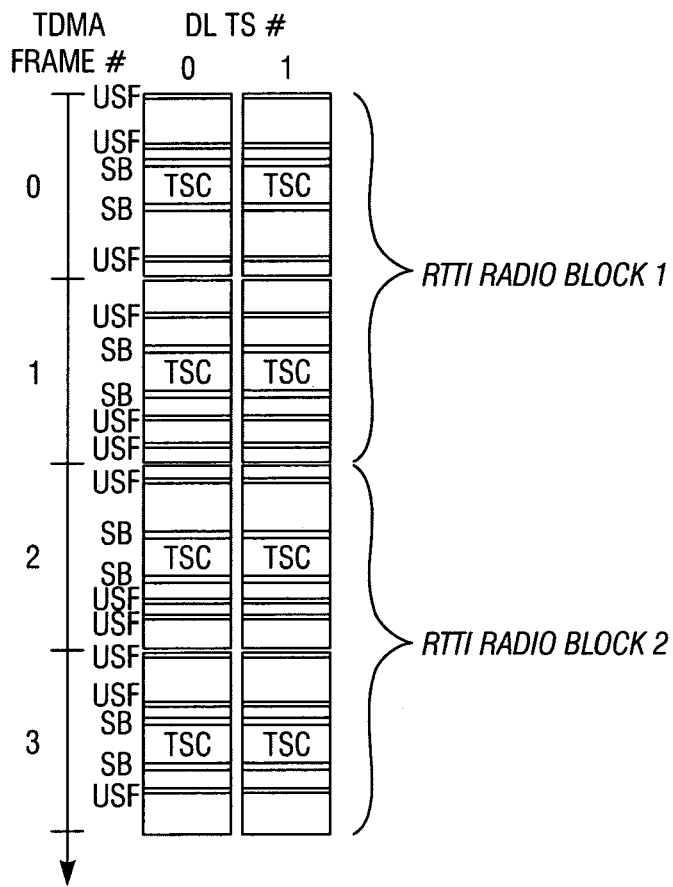
FIG. 3 (Prior Art) illustrates the reservation of legacy USF bits for RTTI radio blocks.
Figure 4:
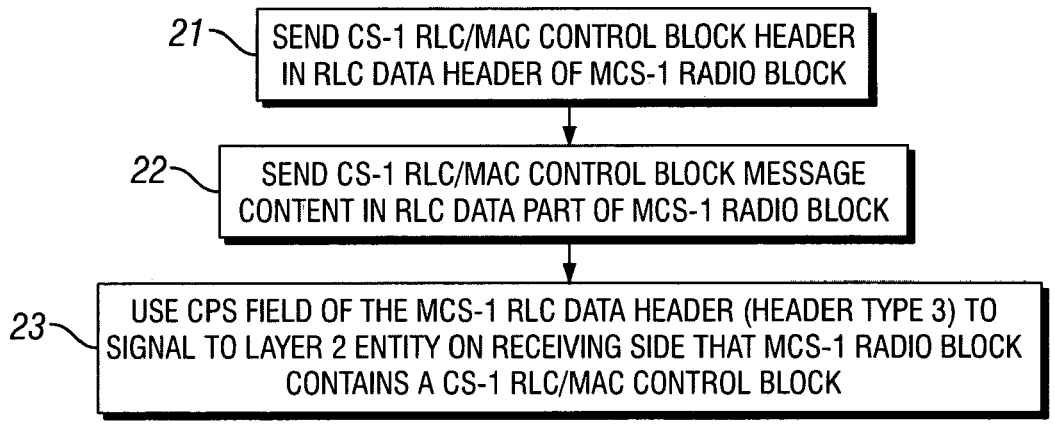
FIG. 4 is a flow chart illustrating the steps of a first exemplary embodiment of an inventive method of transmitting a CS-1 RLC/MAC control block to an EGPRS mobile station.

FIG. 4 is a flow chart illustrating the steps of a first exemplary embodiment of an inventive method of transmitting a CS-1 RLC/MAC control block to an EGPRS mobile station. At step 21, the CS-1 RLC/MAC control block header of the RLC/MAC control message is sent in the RLC data header of the MCS-1 radio block. At step 22, the CS-1 RLC/MAC control block message content may be sent in the RLC data part of the MCS-1 block. At step 23, the coding and puncturing scheme (CPS) field of the MCS-1 RLC data header (header type 3) is utilized to signal to the layer 2 entity on the receiving side that the MCS-1 radio block contains a CS-1 RLC/MAC control block.

Figure 5:
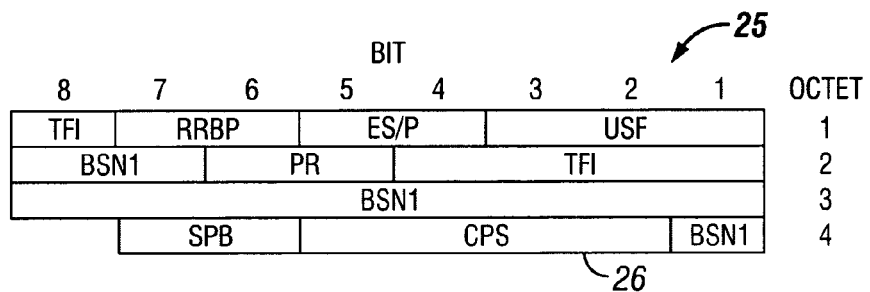
FIG. 5 illustrates an EGPRS downlink RLC data block header for coding schemes MCS-1 through MCS-4 in an exemplary embodiment of the present invention.

FIG. 5 illustrates an EGPRS downlink RLC data block header 25 for coding schemes MCS-1 through MCS-4 in an exemplary embodiment of the present invention. Table 2 below is a table of the CPS indicator field 26 for header type 3. As shown in Table 2, the CPS field for header type 3 has some spare code points. One of these is used to indicate "MCS-1/P1, containing a CS-1 RLC/MAC control block". This indicates to the receiving MS that the MCS-1 header contains CS-1 RLC/MAC control block header content and the MCS-1 data block contains CS-1 RLC/MAC control block message content. The CPS field is put in the same bit positions in the MCS-1 block carrying a CS-1 RLC/MAC control block as in a regular MCS-1 radio block (carrying RLC data).

TABLE 2

| Bits 4321 | First Block CPS |
|---|---|
| 0000 | MCS-4/P1 |
| 0001 | MCS-4/P2 |

TABLE 2-continued

| Bits 4321 | First Block CPS |
|---|---|
| 0010 | MCS-4/P3 |
| 0011 | MCS-3/P1 |
| 0100 | MCS-3/P2 |
| 0101 | MCS-3/P3 |
| 0110 | MCS-3/P1 with padding (MCS-8 retransmission) |
| 0111 | MCS-3/P2 with padding (MCS-8 retransmission) |
| 1000 | MCS-3/P3 with padding (MCS-8 retransmission) |
| 1001 | MCS-2/P1 |
| 1010 | MCS-2/P2 |
| 1011 | MCS-1/P1 |
| 1100 | MCS-1/P2 |
| | All other values are reserved for future use |

NOTE:
The bit numbering is relative to the field position.

Figure 6:
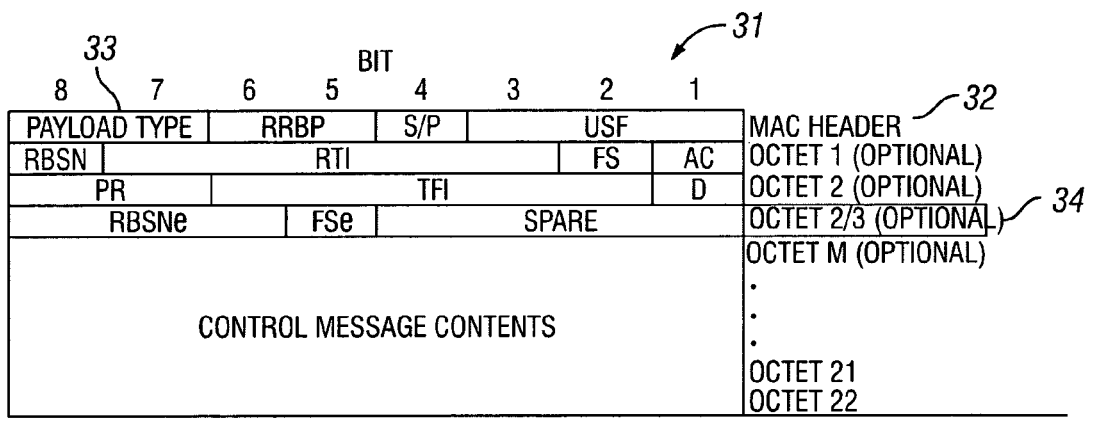
FIG. 6 illustrates a downlink CS-1 RLC/MAC control block together with its MAC header utilized for header type 3 in an exemplary embodiment of the present invention.

FIG. 6 illustrates a downlink CS-1 RLC/MAC control block 31 together with its MAC header 32. The rest of the fields of header type 3 are replaced by the RLC/MAC control header of a CS-1 block. There are up to 28 bits in the CS-1 RLC/MAC control header. In the MCS-1 header, there is room for 31 bits. When the CPS field has been reserved, there are 27 bits left (the CPS field is 4 bits), i.e., one bit less than necessary. To solve this problem, the "payload type" field 33 in the MAC header of the CS-1 RLC/MAC control block of FIG. 6 is reduced by one bit. The payload type field has two bits, used as shown in Table 3 below. Code point "00" is not needed since the block does not contain an RLC data block. Code point "11" is not needed since it is reserved (i.e., not used) in the current CS-1 block. Therefore, there are only two necessary code points, and the length of the "payload type" field can be reduced to 1 bit. In this manner, the RLC/MAC control header is reduced to 27 bits, which will fit into the MCS-1 header together with the reserved CPS field (4 bits).

Note that the optional "Octet ⅔" 34 is included in case of extended CS-1 RLC/MAC control block message segmentation. Its presence is indicated through the combination of the RBSN bit=1 (RBSNe) and the FS bit=0 (FSe).

TABLE 3

| Bit 8 7 | Payload Type |
|---|---|
| 0 0 | RLC/MAC block contains an RLC data block |
| 0 1 | RLC/MAC block contains an RLC/MAC control block that does not include the optional octets of the RLC/MAC control header |
| 1 0 | In the downlink direction, the RLC/MAC block contains an RLC/MAC control block that includes the optional first octet of the RLC/MAC control header. In the uplink direction, this value is reserved. |
| 1 1 | Reserved. In this version of the protocol, the mobile station shall ignore all fields of the RLC/MAC block except for the USF field |

Thus, when RTTI is introduced, there will be two different radio blocks used for sending control messages; the legacy CS-1 radio blocks and the reduced TTI MCS-1 radio blocks. Table 4 below is a summarization of the characteristics of the legacy radio blocks and the RTTI radio blocks.

TABLE 4

| Type | TTI | Bursts per Radio Block | Coding Schemes |
|---|---|---|---|
| Legacy | 20 ms | 4 | CS-1 to CS-4 MCS-1 to MCS-4 MCS-5 to MCS-9 |
| RTTI | 10 ms | 4 | CS-1 MCS-1 to MCS-4 MCS-5 to MCS-9 |

There is a dynamic uplink allocation using the USF. No matter what is sent on the downlink, the legacy MS as well as the RTTI MS must be able to decode the USF. Note that with current restrictions, a legacy GPRS MS cannot decode the USF in an 8PSK-modulated EGPRS radio block.

Figure 7:
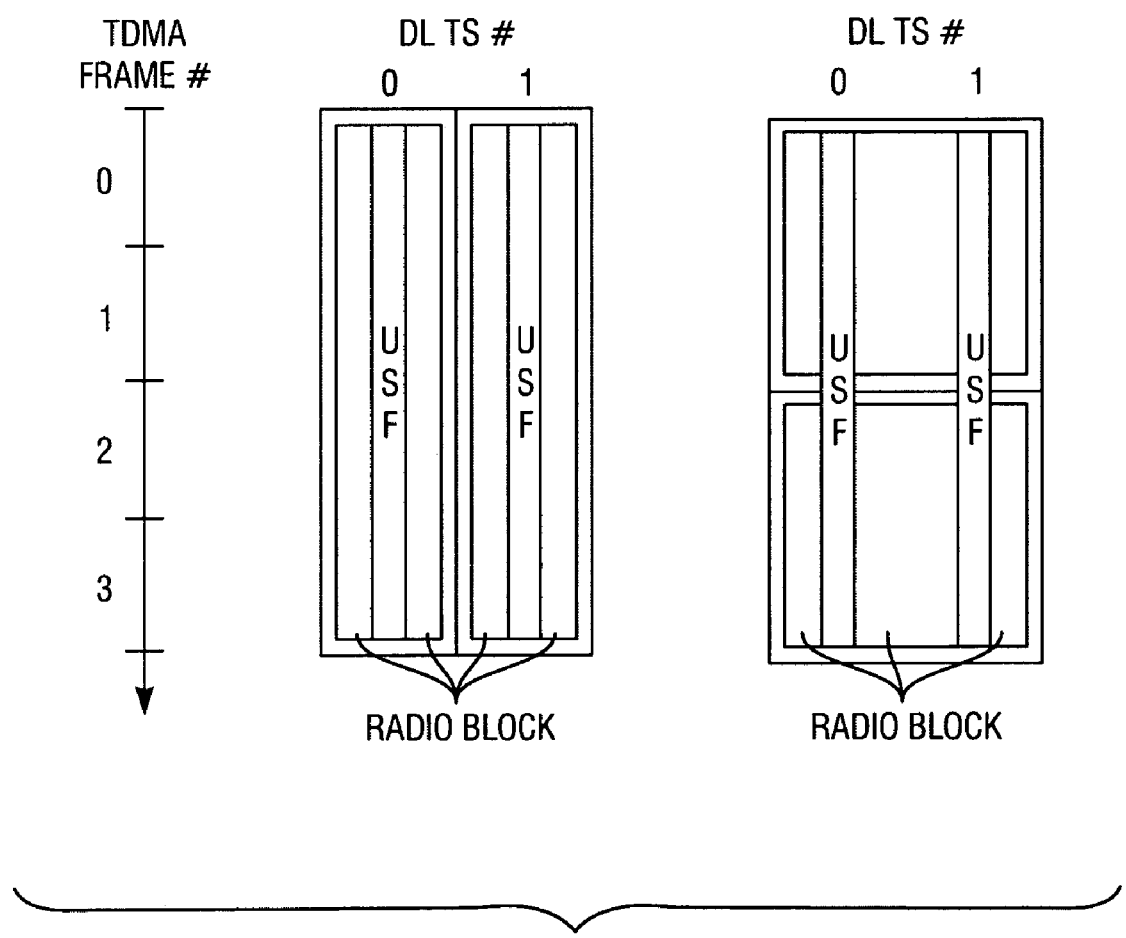
FIG. 7 is a schematic illustration of USF mapping in an exemplary embodiment of the present invention.

FIG. 7 is a schematic illustration of BTTI USF mapping in an exemplary embodiment of the present invention. Whether legacy or RTTI blocks are transmitted in the downlink, the BTTI USF is always sent the legacy way, i.e., mapped over four consecutive 20-ms TDMA frames. The left side of FIG. 7 shows the case in which legacy radio blocks are sent in the downlink, and the right side shows the case in which RTTI radio blocks are sent.

Figure 8:
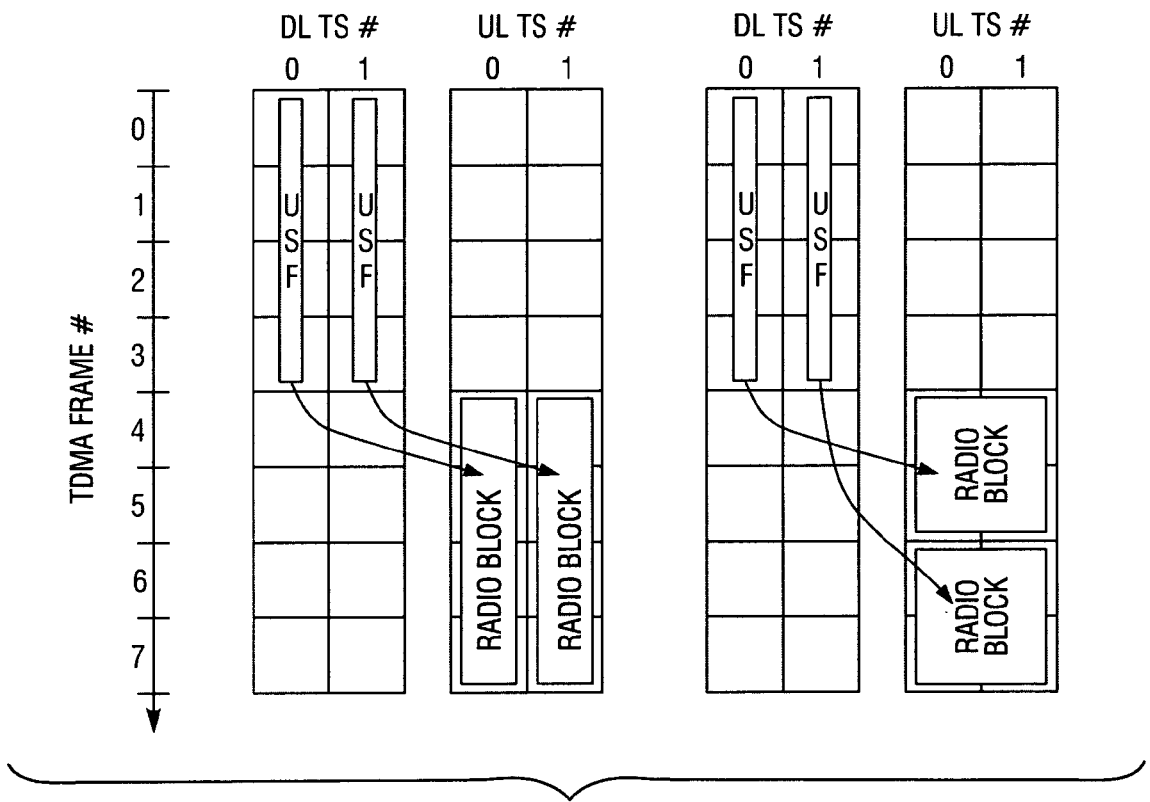
FIG. 8 illustrates the allocation of uplink radio blocks to a legacy MS and an RTTI MS using the USF in an exemplary embodiment of the present invention.

FIG. 8 illustrates the allocation of uplink radio blocks to a legacy MS and an RTTI MS using the BTTI USF in an exemplary embodiment of the present invention. The BTTI USF is read the same way but interpreted differently depending on whether the MS is a legacy MS or an RTTI MS. The left side of FIG. 8 shows the legacy case in which a USF on one downlink timeslot allocates an uplink radio block on the same timeslot. The right side shows the RTTI case in which a USF on downlink timeslot-0 allocates an RTTI radio block on the first 10 ms of timeslots 0 and 1, and a USF on downlink timeslot-1 allocates an RTTI radio block on the last 10 ms of timeslots 0 and 1.

Figure 9:
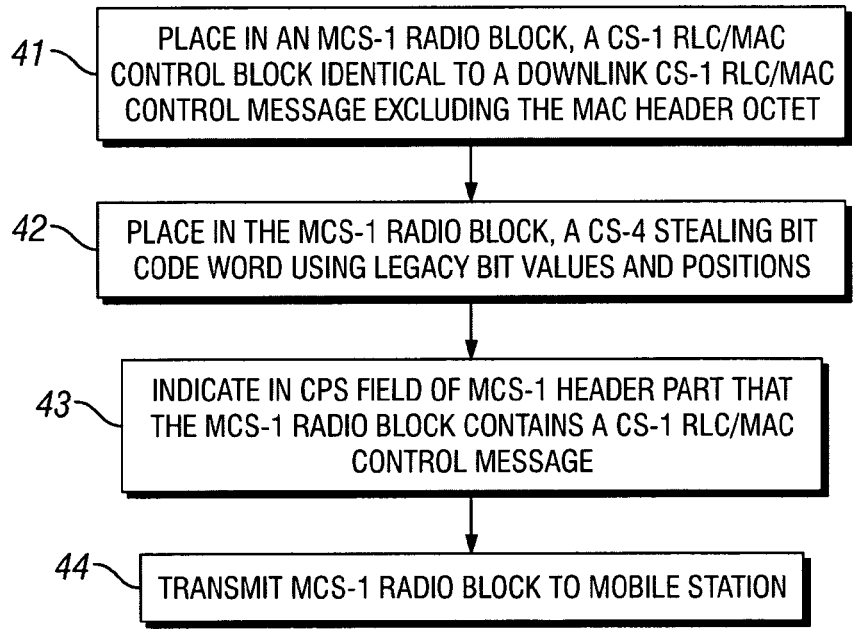
FIG. 9 is a flow chart illustrating the steps of a second exemplary embodiment of an inventive method of transmitting a CS-1 RLC/MAC control message to an EGPRS mobile station.

FIG. 9 is a flow chart illustrating the steps of a second exemplary embodiment of an inventive method of transmitting a CS-1 RLC/MAC control message to an EGPRS mobile station. At step 41, the BSS places in an MCS-1 radio block, an RLC/MAC control message having a header part and a message part identical to a coding scheme CS-1 RLC/MAC control message excluding the MAC header octet. At step 42, the BSS places in the radio block, a coding scheme CS-4 stealing bit code word using legacy stealing bits. At step 43, the BSS indicates in the CPS field of the header that the radio block contains a CS-1 RLC/MAC control block. At step 44, the BSS transmits the MCS-1 radio block to the mobile station.

Figure 10:
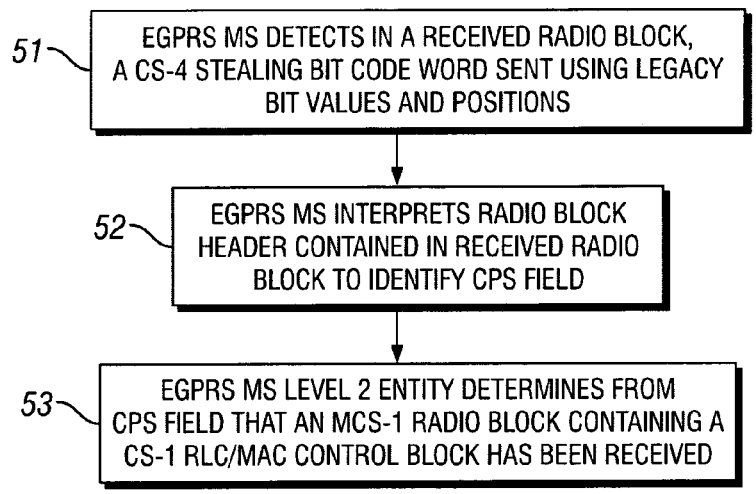
FIG. 10 is a flow chart illustrating the steps of an exemplary embodiment of an inventive method of receiving and detecting a CS-1 RLC/MAC control block in an EGPRS mobile station.

FIG. 10 is a flow chart illustrating the steps of an exemplary embodiment of an inventive method of receiving and detecting an RLC/MAC control message in an EGPRS mobile station. At step 51, the EGPRS MS detects in the received radio block, a coding scheme CS-4 stealing bit code word sent using legacy stealing bit values and bit positions. At step 52, in response to detecting the CS-4 stealing bit code word, the EGPRS MS interprets the (MCS-1 to MCS-4) block header contained in the received radio block to identify the CPS field. At step 53, the EGPRS MS determines from the CPS field that an MCS-1 radio block containing a CS-1 RLC/MAC control block has been received.

Figure 11:
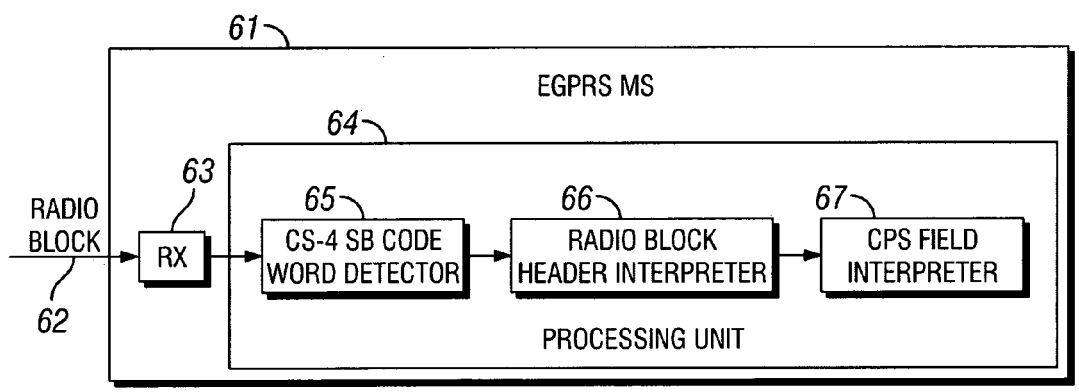
FIG. 11 is a simplified block diagram of an exemplary embodiment of an inventive processing unit in a mobile station.

FIG. 11 is a simplified block diagram of an exemplary embodiment of an inventive processing unit in an EGPRS MS 61. A radio block 62 is received by a receiver 63, which supplies the radio block to a processing unit 64. The processing unit includes a CS-4 stealing bit code word detector 65, which detects in the received radio block, a coding scheme CS-4 stealing bit code word sent using legacy stealing bit values and positions. The stealing bit code word detector may detect the CS-4 stealing bit code word using stealing bits interpreted in the legacy Basic Transmit Time Interval (BTTI) burst sequence. When the CS-4 stealing bit code word is detected, a radio block header interpreter 66 determines that an MCS-1 to MCS-4 block header is contained in the received radio block and is therefore able to identify the CPS field. When the radio block is transmitted in an RTTI burst sequence, the radio block header interpreter interprets the radio block header using the bursts interpreted in the RTTI burst sequence as a Header Type 3. A CPS field interpreter 67 determines from the CPS field that a CS-1 RLC/MAC control block has been received. The CPS field interpreter may be a level 2 entity in the EGPRS MS.

Although preferred embodiments of the present invention have been illustrated in the accompanying drawings and described in the foregoing Detailed Description, it is understood that the invention is not limited to the embodiments disclosed therein, but is defined by the following claims.

The invention claimed is:

1. A method of transmitting a downlink, coding scheme CS-1 Radio Link Control/Media Access Control (RLC/MAC) control message to an Enhanced General Packet Radio Service (EGPRS) mobile station, said control message including an RLC/MAC control block having header content and message content, said method comprising the steps of:
   transmitting the control block header content of the downlink CS-1 RLC/MAC control message in an RLC data header of an MCS-1 radio block;
   transmitting the RLC/MAC control block message content of the downlink CS-1 RLC/MAC control message in an RLC data part of the MCS-1 block; and
   utilizing a coding and puncturing scheme (CPS) field of the MCS-1 RLC data header to signal to a layer 2 entity in the EGPRS mobile station that the MCS-1 radio block contains a CS-1 RLC/MAC control block.

2. The method as recited in claim 1 wherein, if the CS-1 RLC/MAC control message is too long to fit in a single MCS-1 radio block, the method further comprises placing portions of the control message in a plurality of MCS-1 radio blocks until the entire CS-1 RLC/MAC control message is sent.

3. A method of transmitting a Radio Link Control/Media Access Control (RLC/MAC) control message to an Enhanced General Packet Radio Service (EGPRS) mobile station, said method comprising the steps of:
   placing in a modulation and coding scheme MCS-1 radio block, a coding scheme CS-1 RLC/MAC control message having a header part and a message part identical to a downlink CS-1 RLC/MAC control message excluding the MAC header octet;
   placing in the MCS-1 radio block, a coding scheme CSA stealing bit code word using legacy bit values and legacy bit positions;
   indicating in a coding and puncturing scheme (CPS) field of the MCS-1 header part that the MCS-1 radio block contains a CS-1 RLC/MAC control message excluding the MAC header octet; and
   transmitting the MCS-1 radio block to the mobile station.

4. The method as recited in claim 3, wherein if the CS-1 RLC/MAC control message is too long to fit in a single MCS-1 radio block, the method further comprises placing portions of the control message in a plurality of MCS-1 radio blocks until the entire CS-1 RLC/MAC control message is sent.

5. A method in an Enhanced General Packet Radio Service (EGPRS) mobile station of detecting that a received radio block contains a coding scheme CS-1 Radio Link Control/Media Access Control (RLC/MAC) control block, said method comprising the steps of:
   detecting in the received radio block, a coding scheme CS-4 stealing bit code word sent using legacy bit values and legacy bit positions;
   in response to detecting the CS-4 stealing bit code word, interpreting a radio block header contained in the received radio block to identify a coding and puncturing scheme (CPS) field; and
   determining from the CPS field that an MCS-1 radio block containing a CS-1 RLC/MAC control block has been received.

6. The method as recited in claim 5, wherein the step of interpreting a radio block header includes interpreting the radio block header according to MCS Header Type 3.

7. The method as recited in claim 5, wherein the step of detecting in the received radio block, a coding scheme CS-4 stealing bit code word includes detecting the CS-4 stealing bit code word using legacy bit values and legacy bit positions interpreted in the legacy Basic Transmit Time Interval (BTTI) burst sequence.

8. The method as recited in claim 7, wherein the radio block is transmitted in a Reduced Transmit Time Interval (RTTI) burst sequence, and the step of interpreting a radio block header includes interpreting the radio block header using the bursts interpreted in the RTTI burst sequence as a Header Type 3.

9. The method as recited in claim 5, wherein the step of determining from the CPS field that a control message has been received is performed by a layer 2 entity in the EGPRS mobile station.

10. A processing unit in an Enhanced General Packet Radio Service (EGPRS) mobile station for detecting that a received radio block contains a coding scheme CS-1 Radio Link Control/Media Access Control (RLC/MAC) control block, said processing unit comprising:
    a stealing bit detector for detecting in the received radio block, a coding scheme CS-4 stealing bit code word sent using legacy bit values and legacy bit positions;
    a radio block header interpreter responsive to detecting the CS-4 stealing bit code word, for interpreting a radio block header contained in the received radio block to identify a coding and puncturing scheme (CPS) field; and
    a CPS field interpreter for determining from the CPS field that an MCS-1 control block has been received.

11. The processing unit as recited in claim 10, wherein the radio block header interpreter is configured to interpret the radio block header according to MCS Header Type 3.

12. The processing unit as recited in claim 10, wherein the stealing bit detector is configured to detect the CS-4 stealing bit code word using legacy bit values and legacy bit positions interpreted in the legacy Basic Transmit Time Interval (BTTI) burst sequence.

13. The processing unit as recited in claim 12, wherein the radio block is transmitted in a Reduced Transmit Time Interval (RTTI) burst sequence, and the radio block header interpreter is configured to interpret the radio block header using the bursts interpreted in the RTTI burst sequence as a Header Type 3.

14. The processing unit as recited in claim 10, wherein the CPS field interpreter comprises a layer 2 entity in the EGPRS mobile station.

* * * * *

UNITED STATES PATENT AND TRADEMARK OFFICE
CERTIFICATE OF CORRECTION

PATENT NO.        : 8,238,276 B2  
APPLICATION NO.   : 12/531224  
DATED             : August 7, 2012  
INVENTOR(S)       : Diachina et al.

Page 1 of 1

It is certified that error appears in the above-identified patent and that said Letters Patent is hereby corrected as shown below:

On Page 2, in Field (56), under "OTHER PUBLICATIONS", in Column 2, Line 3, delete "Pavoa" and insert -- Povoa --, therefor.

In Column 3, Line 56, delete "deinterleaves" and insert -- deinterleavers --, therefor.

In Column 6, Line 19, insert -- The following header fields are shown in the figures: --.

In Column 9, Line 36, in Claim 2, delete "claim 1 wherein," and insert -- claim 1, wherein --, therefor.

Signed and Sealed this  
Eighteenth Day of December, 2012

David J. Kappos  
*Director of the United States Patent and Trademark Office*